Figure 1:
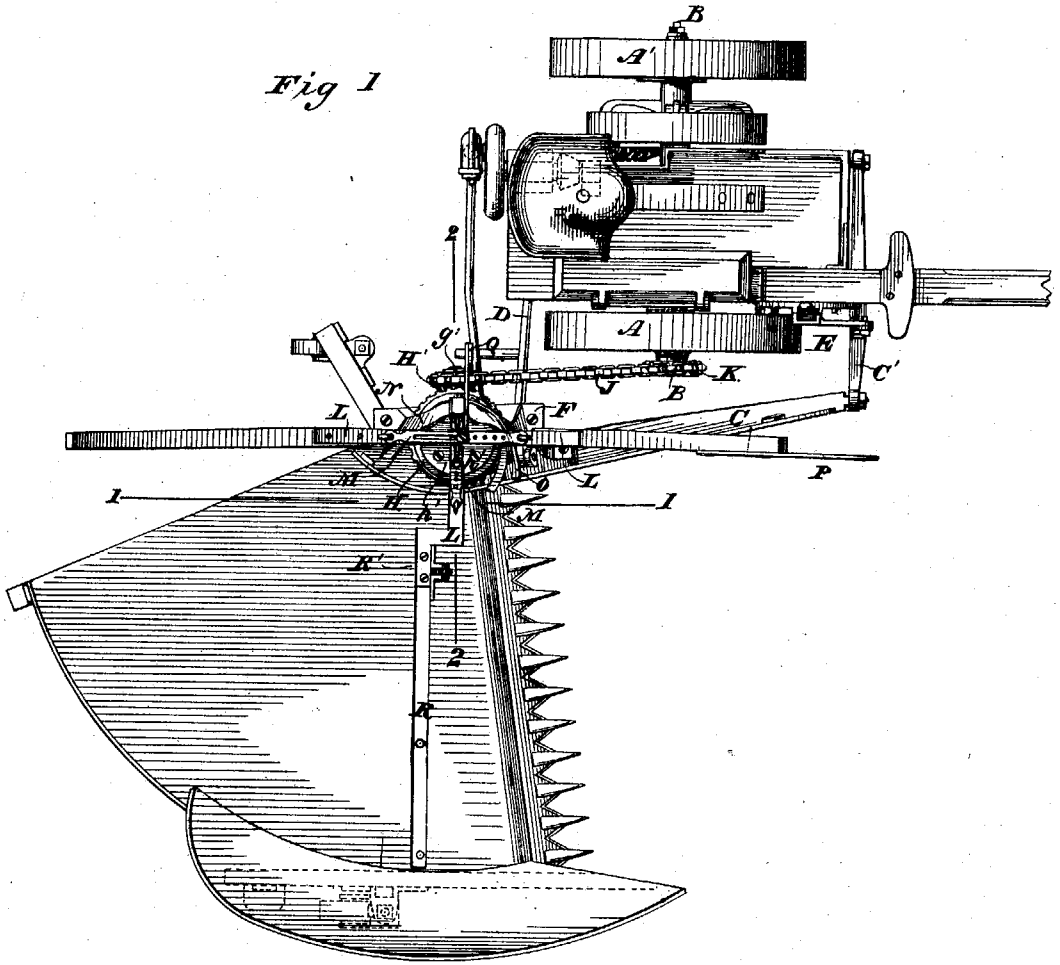

3 Sheets—Sheet 1.

J. S. MARSH,

Assignor to H. A. MARSH.

HARVESTER RAKE.

No. 10,095. Reissued Apr. 25, 1882.

WITNESSES

C. Clarence Poole

Wm. A. Skinkle.

INVENTOR

James S Marsh.

By his Attorneys

Baldwin, Hopkins & Peyton.

N. PETERS, Photo-Lithographer, Washington, D. C.

3 Sheets—Sheet 2.
J. S. MARSH,
Assignor to H. A. MARSH.
HARVESTER RAKE.
No. 10,095. Reissued Apr. 25, 1882.
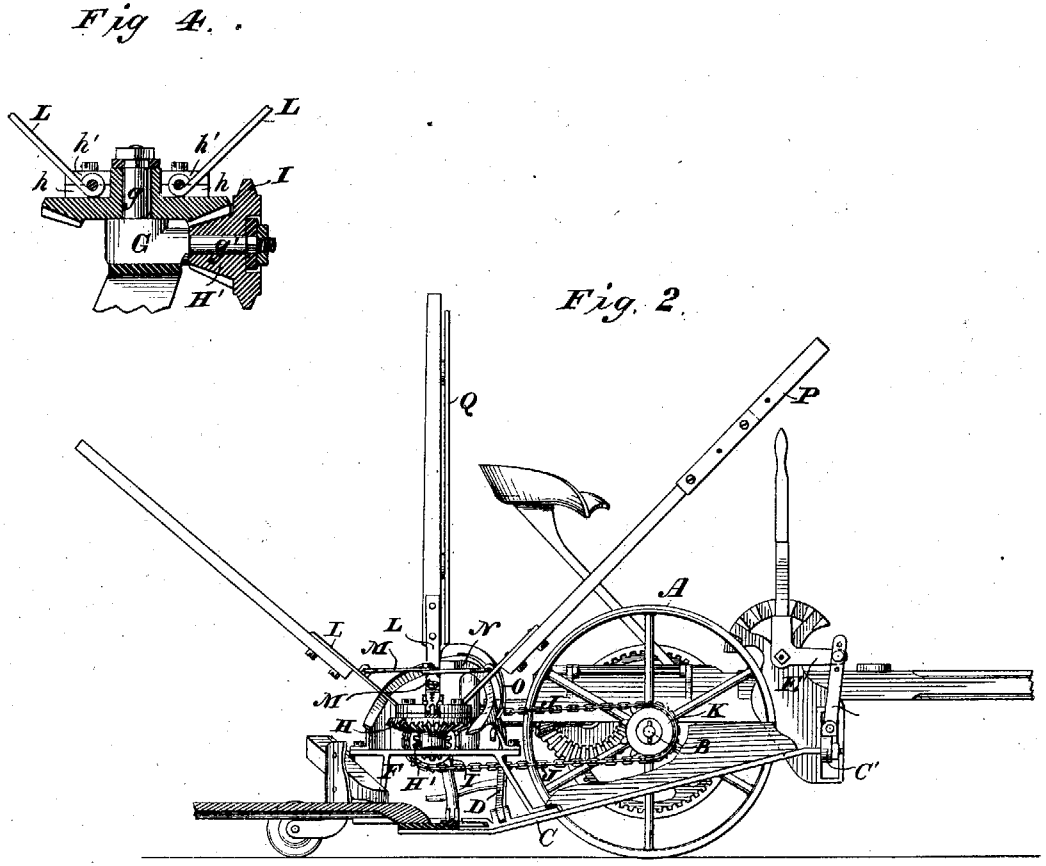
WITNESSES
C. Clarence Poole
Wm A. Skinkle
INVENTOR
James S Marsh
By his Attorneys
Baldwin, Hopkins & Peyton.
N. PETERS. Photo-Lithographer, Washington, D. C.

J. S. MARSH,
Assignor to H. A. MARSH.
HARVESTER RAKE.
No. 10,095. Reissued Apr. 25, 1882.
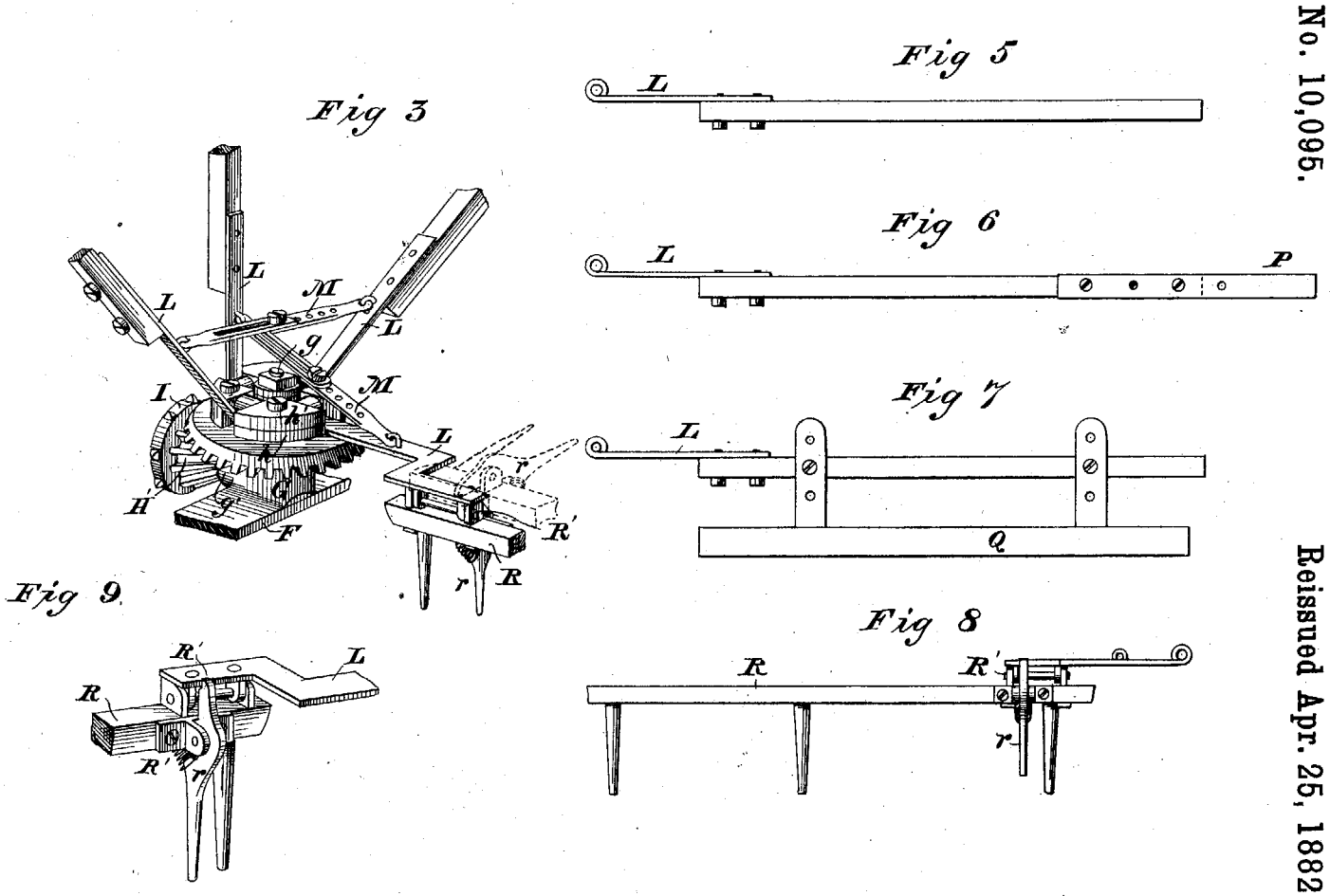
WITNESSES
C. Clarence Poole
Wm. A. Skinkle.
INVENTOR
James S Marsh.
By his Attorneys
Baldwin, Hopkins & Peyton.
N. PETERS. Photo-Lithographer, Washington, D. C.

UNITED STATES PATENT OFFICE.

JAMES S. MARSH, OF LEWISBURG, PENNSYLVANIA, ASSIGNOR TO HARRY A. MARSH, OF SAME PLACE.

HARVESTER-RAKE.

SPECIFICATION forming part of Reissued Letters Patent No. 10,095, dated April 25, 1882.

Original No. 164,926, dated June 29, 1875. Application for reissue filed May 21, 1877.

DIVISION B.

*To all whom it may concern:*

Be it known that I, JAMES S. MARSH, of Lewisburg, in the county of Union and State of Pennsylvania, have invented certain new and useful Improvements in Harvester-Rakes, of which the following is a full, clear, and exact description, reference being had to the accompanying drawings, making part of this specification, in which—

Figure 1 is a plan view of the machine, showing the rake in working position. Fig. 2 is a side elevation of the same, partly in section on the line 1 1 of Fig. 1. Fig. 3 is a view in perspective of the crown-wheel and the rake and beater arms connected therewith. Fig. 4 is a vertical transverse section through the crown-wheel and its driving-pinion on the line 2 2 of Fig. 1. Fig. 5 is a side view of one of the beater-arms. Fig. 6 is a similar view of the same with a lengthening-bar attached to its end. Fig. 7 is a side elevation of another of the beater-arms with an adjustable blade attached; Fig. 8, a side elevation of the rake-arm; Fig. 9, a perspective view of the spring-catch of the rake-arm.

The invention herein claimed relates to that class of automatic harvester-rakes consisting of rising and falling radial rake and reel arms revolving around an axis substantially vertical, to gather the standing grain to the cutters, and when severed sweep it from the platform and discharge it in rear of the draft-carriage or inner drive-wheel.

The subject-matter claimed will hereinafter specifically be designated.

In the accompanying drawings, two driving-wheels, A A′, are shown as connected with the main axle B by means of the usual backing-ratchets. The main frame is mounted upon this axle. The cutters are driven in the usual way by a crank and pitman operated by gearing from the main axle in well-known ways.

The inner end of the finger-beam is rigidly secured to the rear end of the drag-bar C, extending upward and forward and pivoted at its front end to a transverse arm or link-rod, C′, which is in turn pivoted at its outer end to the outer front corner of the main frame. The finger-beam is likewise connected with the main frame by means of a lateral brace or coupling-arm, D, pivoted at one end to the drag-bar, and near the rear end thereof, and at the other end to the main frame near its outer rear corner. The front arm or link-rod, C′, is connected to a crank or elbow-lever, E, pivoted upon the main frame within reach of the driver when in his seat, by which means he can adjust the front end of the drag-bar up or down to vary the height of cut.

A lifting-lever mounted upon the rear end of the main frame serves to raise and lower the cutting apparatus when used as a mower; but it is not required when reaping, as in that case the quadrant-shaped platform is secured to the finger-beam, being provided with the usual dividers and fingers, and mounted upon two supporting caster-wheels, which serve as fulcrums about which the platform and its cutting apparatus are adjusted when the drag-bar is raised or lowered by its lever. Both caster-wheels may be applied directly under the main platform, at opposite sides thereof, and admit of the cutting apparatus being adjusted alike at both ends.

A rake-supporting standard, F, made somewhat in the form of an arch or bridge, with two legs united at their upper ends, has one leg secured rigidly to the platform and the other to the drag-bar, so as to form a stiffening-brace at the point of connection between the drag-bar, finger-beam, and platform. This casting I term a "straddling standard," as it strides or straddles the finger-beam, so as to allow the cutting apparatus and pitman to play freely beneath it. A block, G, secured upon the standard, is provided with a central vertical pin, *g*, around which a crown-wheel, H, provided with bevel-teeth, rotates freely. This wheel is driven by a corresponding bevel-pinion, H′, turning freely around a fixed shaft, *g′*, projecting from the block above mentioned. A sprocket-wheel, I, secured to this pinion H′, is encircled by a driving-chain band, J, passing over a sprocket-wheel, K, keyed on the inner end of the main driving-axle; or a sprocket-wheel may be attached directly to the inner driving-wheel. The crown-wheel H thus receives continuous rotary motion when the machine is moving forward.

Sector-shaped lugs *h*, cast on the top of the crown-wheel, have radial spaces between them for the reception of the hinged or inner ends, L, of the rake and gathering arms. Each sector has two depressions formed in it to receive pins or cross-heads, forming the pivots for the rake and reel arms, which pins are held down in their places by means of sector-caps $h'$, bolted upon the sectors. The arms are thus firmly secured against lateral strains, while free to rise and fall vertically.

Metal arms L, pivoted to the crown-wheel H, as above mentioned, have the rake and reel arms secured to them, as shown. The bar L, by which the rake is connected to the crown-wheel, is bent backward, as shown, from the line of its attachment to the crown-wheel for the purpose of bringing the rake farther to the rear as it revolves, and thus deposit the gavel farther from the standing grain. The opposite arms are respectively connected together by means of extensible rods M. The ends of said rods are pivoted to their respective pair of arms, so that the latter can vibrate freely as the crown-wheel is revolved.

It is desirable to give two positions to the rake and reel arms as they revolve, so that in moving over the platform the arms shall sweep in a plane parallel to its surface and then rise, so as to assume an upright position when passing around to commence their acting stroke. After the said arms have completed their sweeps over the platform they may rise suddenly; but it is desired to have the arms descend in the arc of a circle as they successively enter the standing grain and pass back upon the platform. To effect such movements a curved rail or cam, N, is erected upon the rake-supporting standard, as shown in Figs. 1 and 2, its acting surfaces being shaped in such manner as to guide said arms as they rise and descend. As this rail or cam overhangs the outer portion of the crown-wheel, it will cause the arms to lean toward the platform as they pass around to commence their work.

To the outer end of the cam-rail N a spring-fender, O, is secured, which curves around in front, as shown in Figs. 1 and 2, and serves as a bearing and guide for the rake and reel arms as they rotate, and affords a chance for said arms to yield should they be subjected to any undue strain which would be liable to impair or derange the working parts.

The reel or beater arms, which sweep around before the rake-arm and gather in the grain to the cutters, are provided with adjustable blades P, applied to them, whereby they can be lengthened or shortened, as shown in Fig. 6.

In Fig. 7 the arm is shown with an adjustable blade, Q, applied to it, so that it can be raised or lowered to adapt the rake for gathering short or fallen grain.

The blade which is applied to the end of the beater-arm, as shown in Fig. 6, is designed for adapting this arm to reach grain which may overhang the divider or inner side board.

The rake-arm R is connected by a pivot-joint, R', to its arm L, as clearly shown in Figs. 1, 3, 8, and 9, so that the rake-teeth can be turned round out of the way and thrown out of action, as indicated by dotted lines in Fig. 3.

A spring-latch, $r$, on said arm is furnished with a handle, so that the driver, while in his seat, can adjust the arm as he may desire. This latch is so formed that it will act upon the metal arm L and hold the rake-arm firmly in raking position, as shown in full lines in Fig. 3, or in the position shown by dotted lines in said figure. While thus providing for turning the rake-teeth the arm thereof can be used at times for gathering in the grain to be cut, and when a sufficient quantity of grain has been cut the driver can quickly adjust the rake-teeth so as to discharge the gavel from the platform. This is a very important feature in connection with this class of rakes, especially when the standard of the rake is mounted on a low standard near the heel of the cutting apparatus.

The speed of the raking apparatus may be varied relatively to that of the machine by varying the relative size of the sprocket-wheels by which the rake is driven.

In this application certain subject-matter claimed in the division of this application filed simultaneously herewith is incidentally disclosed as necessary to a proper understanding of what is herein claimed; but such subject-matter is not a part of what is herein intended to be patented. This division is limited to merely what is herein claimed.

Having thus described my invention, what I claim as new, and desire to secure by Letters Patent, is—

1. The rake and reel arms pivoted at their inner ends to the hub or crown-wheel by means of the cross heads or bars fitting into suitable cavities in said hub or wheel, substantially as described.

2. The rake attached to its revolving hub or crown-wheel by means of the bar bent backward from the line of attachment, as set forth, to bring the rake parallel with, but in rear of, its supporting-arm, for the purpose of depositing the gavel farther from the standing grain, substantially as described.

3. The combination of the rake-arm, the axially-turning rake-head pivoted axially thereunder, and the angular spring-lever mounted on the rake-head and abutting against the rake-arm, these members being constructed and operating in combination in the manner and for the purpose described.

4. The spring-guide applied to the cam-rail, substantially as described.

5. The combination of the crown-wheel revolving on a vertical axis, the beater-arm pivoted thereon, and the longitudinally-adjustable blade, forming a prolongation of the beater and sliding directly thereon to vary its length.

JAMES S. MARSH.

Witnesses:
WM. D. BALDWIN,
WM. J. PEYTON.